United States Patent
Panpaliya et al.

(10) Patent No.: US 8,400,491 B1
(45) Date of Patent: Mar. 19, 2013

(54) USE-BASED ADAPTIVE VIDEO CLIENT FOR A BANDWIDTH-CONSTRAINED NETWORK

(75) Inventors: Monika Panpaliya, Leawood, KS (US); David Uel McKinney, Olathe, KS (US); John Lynch, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1625 days.

(21) Appl. No.: 11/832,154

(22) Filed: Aug. 1, 2007

(51) Int. Cl.
*H04N 7/14* (2006.01)
(52) U.S. Cl. ............... 348/14.12; 348/14.1; 348/14.13
(58) Field of Classification Search .... 348/14.12–14.15; 375/240.02; 370/260–261
See application file for complete search history.

(56) References Cited

U.S. PATENT DOCUMENTS

| | | | | |
|---|---|---|---|---|
| 5,617,135 | A * | 4/1997 | Noda et al. | 348/14.12 |
| 5,847,752 | A * | 12/1998 | Sebestyen | 348/14.12 |
| 6,757,005 | B1 * | 6/2004 | Elbaz et al. | 348/14.09 |
| 7,619,645 | B2 * | 11/2009 | Cockerton | 348/14.13 |
| 7,940,653 | B2 * | 5/2011 | Woodworth et al. | 370/229 |

* cited by examiner

*Primary Examiner* — Curtis Kuntz
*Assistant Examiner* — Ryan Robinson (57) ABSTRACT

A method, system, and computer-readable media are provided for adjusting one or more video parameters of a video communication session based on a type of use for the video communication session. At least one method includes detecting a use for a certain video communication session and applying a profile of video parameters to the session based on the use. The method further includes detecting a network constraint and adjusting one or more of the video parameters based on the network constraint.

11 Claims, 5 Drawing Sheets

United States Patent US 8,400,491 B1

USE-BASED ADAPTIVE VIDEO CLIENT FOR A BANDWIDTH-CONSTRAINED NETWORK

CROSS-REFERENCE TO RELATED APPLICATIONS

Not applicable.

STATEMENT REGARDING FEDERALLY SPONSORED RESEARCH OR DEVELOPMENT

Not applicable.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present invention is defined by the claims below. Embodiments of the present invention provide a system and method for, among other things, adjusting one or more video parameters of a video communication session based on a type of use for the video communication session.

In a first aspect, a set of computer-readable media provide a method that includes detecting a use for a video communication session and applying a profile of video parameters to the video communication session based on the use. The method further includes detecting at least one constraint on a communication network of the video communication session. Moreover, the method includes adjusting one or more video parameters of the profile based the constraint.

In a second aspect, a set of computer-readable media provide another method that includes periodically monitoring one or more network parameters within a video communication session. The method further includes detecting a network constraint when at least one network parameter reaches a predetermined threshold level. Furthermore, the method includes adjusting one or more video parameters associated with the video communication session based on the network constraint and a use of the video communication session.

In a third aspect, a system provides a use detection component for detecting a type of use for a video communication session, wherein one or more video parameters are applied to the video communication session based on the detected use. The system also provides a network constraint detection component for detecting one or more network constraints when at least one network parameter reaches a predetermined threshold level. Additionally, the system provides a video parameter adjustment component for adjusting at least one of the one or more video parameters based on the detected network constraint.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Various technical terms are used throughout this description. A definition of such terms can be found in *Newton's Telecom Dictionary* by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media which includes computer-storage media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
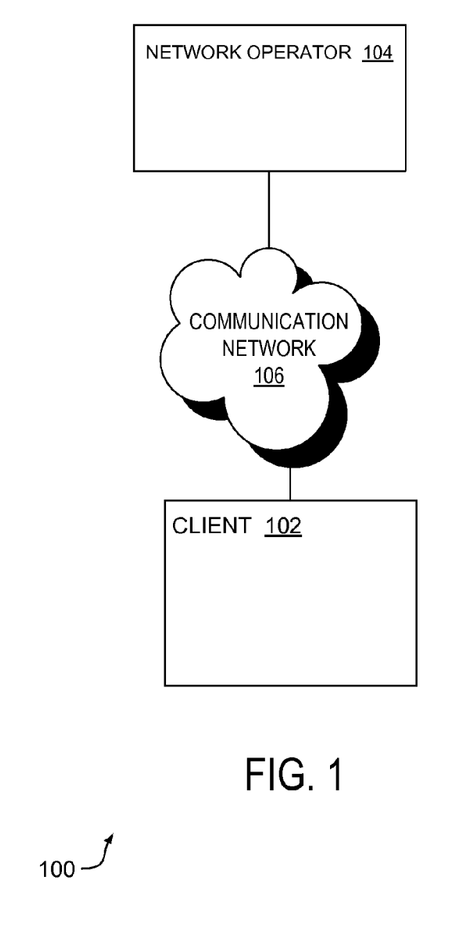
FIG. 1 is a block diagram of an exemplary system for implementing an embodiment of the invention.

FIG. 1 is a block diagram of an exemplary system 100 for implementing an embodiment of the invention. System 100 includes one or more client devices 102, network operator 104, and communication network 106. Each client 102 includes a communication interface. The communication interface may be an interface that can allow the client 102 to be directly connected to another client or other device or allows the client 102 to be connected to another client or other device over communication network 106. Communication network 106 can include, for example, a local area network (LAN), a wide area network (WAN), a network for facilitating wireless communication, or the Internet. In an embodiment, the client 102 can be connected to another client or other device via a wireless communication interface through the communication network 106.

Client 102 may be or can include a desktop or laptop computer, a portable computing device capable of wireless communication, a network-enabled cellular telephone (with or without media capturing/playback capabilities), wireless email client, or other client, machine or device to perform various tasks including Web browsing, search, electronic mail (email) and other tasks, applications and functions. Client 102 may additionally be any portable media device such as digital still camera devices, digital video cameras (with or without still image capture functionality), media players such as personal music players and personal video players, and any other portable media device. Client 102 may also be or can include a server such as a workstation running the Microsoft Windows®, MacOS™, Unix™, Linux™, Xenix™ IBM AIX™, Hewlett-Packard UX™, Novell Netware™, Sun Microsystems Solaris™ OS/2™ BeOS™, Mach™, Apache™, OpenStep™ or other operating system or platform.

Network operator 104 is an entity configured to manage and facilitate the distribution of multimedia content, including video, audio, and text data, to one or more client devices 102 from a plurality of content providers (not shown). In an embodiment, network operator 104 may comprise one or more servers such as workstations running the Microsoft Windows®, MacOS™, Unix™, Linux™, Xenix™, IBM AIX™, Hewlett-Packard UX™, Novell Netware™, Sun Microsystems Solaris™, OS/2™, BeOS™, Mach™, Apache™, OpenStep™ or other operating system or platform. In an embodiment, network operator 104 can manage the distribution of real-time streaming delivery of multimedia content over Internet Protocol (IP) via network 106. In another embodiment, network operator 104 may be a Voice-over IP (VoIP) provider for facilitating VoIP phone calls between two or more clients 102. In yet another embodiment, network operator 104 is configured to facilitate video communication sessions between one or more clients 102.

Figure 2:
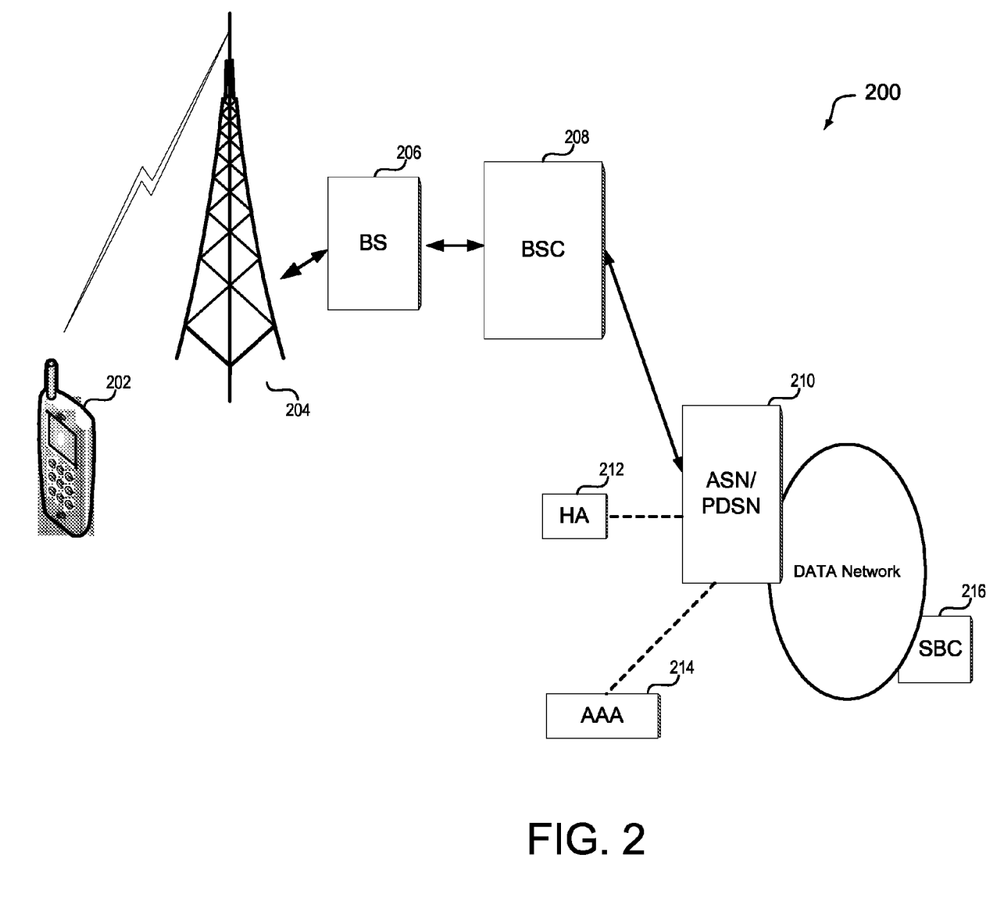
FIG. 2 is a block diagram of an embodiment of another communication network that can be employed by an embodiment of the invention.

FIG. 2 is a block diagram of an embodiment of another communication network 200 that can be employed by an embodiment of the invention. Mobile device 202, a client device such as client 102, may be or can include a laptop computer, a portable computing device capable of wireless communication, a network-enabled mobile telephone (with or without media capturing/playback capabilities), a wireless email client, a personal digital assistant (PDA), or other software client. The mobile device 202 may also include a machine or device to perform various tasks including video conferencing, web browsing, search, electronic mail (email) and other tasks, applications and functions. Mobile device 202 may additionally be a portable media device such as digital camera devices, digital video cameras (with or without still image capture functionality), media players such as personal music players and personal video players, and other portable media devices. The mobile device 202 can include a communication interface that can allow the mobile device 202 to transmit information via radio signals to a communication tower 204.

The Base Station (BS) 206 contains equipment for transmitting and receiving radio signals from a communication tower 204. BS 206 also has other equipment for encrypting and decrypting communication with the Base Station Controller (BSC) 208. The BSC 208 may be configured to receive radio signals that are converted into Time Division Multiplexing (TDM), for instance, from a BS 206. In an embodiment, the BSC 208 can have a plurality of BSs under its control. The BSC 208 may handle the allocation of radio channels, receive measurements from mobile devices, and control handovers from one BS to another BS. Another function of the BSC 208 is to act as a concentrator of communication sessions where many different low capacity connections to the BSs (with relatively low utilization) become reduced to a smaller number of connections towards a Mobile Switching Center (MSC) (with a high level of utilization). The BSC may also be configured to send voice information from the TDM signal to the MSC and data information to an Access Service Network (ASN) or a Packet Data Serving Node (PDSN) 210.

ASN/PDSN 210 is a component of a mobile network. The ASN/PDSN 210 acts as a connection point between a radio access network and an Internet Protocol (IP) network. The ASN/PDSN 210 component may be responsible for managing Point-to-Point Protocol (PPP) sessions between the mobile device's core IP network and the mobile device. The Home Agent (HA) 212 may be a router located in a home network of the mobile device 202. The HA 212 allows a mobile device to connect to the Internet or data network by assigning an IP address and binding it to a Care-of-Address (COA) of a foreign agent (FA). The HA 212 can forward packets to an appropriate network when a mobile device is away from its home area or home network. An authentication, authorization, and accounting (AAA) server 214 is a server program that handles user requests for access to a network and provides AAA services. The AAA server 214 may interact with network access servers, gateway servers, databases, and directories containing user information. A Session Border Controller (SBC) 216 may be a device used in some VoIP networks to exert control over the signaling and media streams involved in setting up, conducting, and tearing down calls. The SBC 216 may be put into the signaling and/or media path between the party making a call and the party receiving the call. In an embodiment, the SBC 216 may act as a VoIP phone when it receives a call from a calling party, and can place a second call to the called party. The effect of this behavior may be that the signaling traffic and media traffic (voice, video, etc.) crosses the SBC. This behavior may also be prevalent during conference communications.

Figure 3:
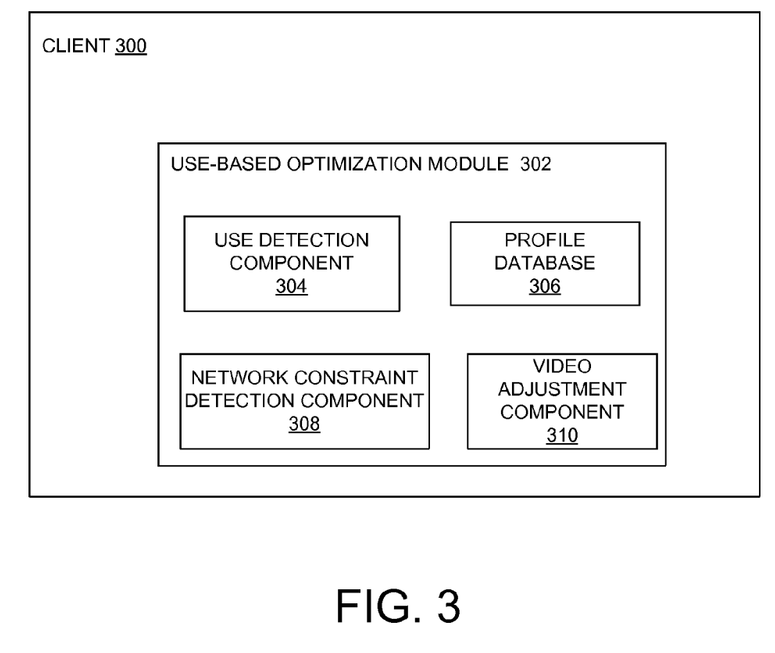
FIG. 3 is a block diagram of an exemplary detailed representation of a client device according to an embodiment of the invention.

FIG. 3 is a block diagram of an exemplary detailed representation of a client device 300 according to an embodiment of the invention. Client 300 includes use-based optimization module (UBOM) 302. UBOM 302 is a computer hardware or software module that is utilized to optimize a user's experience during a video communication session on client 300 based on the user's particular use for the video communication session. For example, if the video communication is being used for communication using American Sign Language (ASL) amongst hearing impaired individuals, then the application may switch to high motion, high detail, low color and low audio quality mode, thus using more bandwidth toward delivering motion rather than color. If the application is for a video conferencing showing people talking, the application may switch to, for example, a mode wherein it offers a low motion, low detail, high color video and high quality audio. If the application is for "see what I see," then the video quality may switch to a mode offering medium motion, high detail and high color. Thus, the available bandwidth can be used to provide different qualities of audio/video that best enhances the user experience for that particular use.

In an embodiment, UBOM 302 comprises a use detection component 304, a profile database 306, a network constraint detection component 308, and a video parameter adjustment component 310. Profile database 306 is utilized to store a profile of video parameters for each of a plurality of video communication uses. Generally, a video parameter is a parameter that helps define the manner in which the video communication session will be presented to a user. The different types of video parameters that can be included in a profile and applied to a video communication session can include, but are not limited to, screen size, resolution, buffer size, frames per second, color, motion, and audio quality parameters. The video parameters within the profile are applied to the corresponding use when a type of use is detected. Video communication uses can include, but are not limited to, video conferencing uses, ASL uses, "see what I see" uses, and generally any other type of video communication use that can be programmed to be recognized by the UBOM 302. The video parameters within each profile are set at optimal levels for each type of use. The optimal level is a predetermined value set by the creator of the profile to achieve an optimal user experience as determined by the creator. In an embodiment, a profile is created and included with the UBOM 302 before it is installed on the client 300. In another embodiment, a profile may be created locally on the client 300 after the UBOM is installed on the client 300. In yet another embodiment, a profile may be downloaded into profile database 306 from a server.

In an embodiment, each video parameter within a profile is assigned a priority level. In an embodiment, the priority level is associated with each video parameter within a profile stored profile database 306. The priority level is used to determine the importance of the video parameter for the associated video communication use. In an embodiment, the more important a video parameter is, the higher the priority level it will be assigned. In such an embodiment, the optimal level of a lower priority video parameter is adjusted before a higher priority video parameter when the UBOM 302 has to adjust video parameters due to a network constraint on the communication network. In an embodiment, a network constraint arises when a network parameter reaches an unfavorable threshold level that negatively affects the performance of the communication network and/or the video communication session. A network parameter is a parameter that affects the performance of a communication network and/or the performance of a video communication session. A network parameter can include, but is not limited to, available bandwidth, jitter, latency, and packet loss. An unfavorable threshold level of a network parameter is a value that, when reached, causes the video parameters applied to the video communication session to not operate at their optimal levels. In an embodiment, the unfavorable threshold level for each network parameter is stored in the profile of the video communication use. Accordingly, when an unfavorable threshold level is reached and a network constraint is detected, the UBOM 302 may adjust the optimal levels of one or more video parameters of the video communication session based on each video parameter's priority level in order to continue to provide an acceptable user experience.

The use detection component 304 is utilized to detect a type of use that a user desires for a video communication session. In an embodiment, UBOM 302 or another module, program, or application is configured with logic that will display a user interface (UI) to a user to allow the user to select or input a particular video communication use. Once the selected/inputted use is detected by the use detection component 304, the UBOM 302 can query profile database 306 for the profile of video parameters associated with the detected use. In another embodiment, the use detection component 304 can be configured to automatically detect a video communication use without the user having to manually select or input a type of use. In such an embodiment, the use detection component 304 may be informed of the type of use by detecting the type of video content being transmitted from the client 300 and/or one or more identifiers associated with data packets of the transmitted video content. Once the associated profile has been identified, the UBOM 302 can apply the video parameters to the video communication session for the client 300.

The network constraint detection component 308 is utilized to periodically monitor and/or measure the current network parameters associated with an existing video communication session in order to detect if a network constraint exists. The network constraint detection component 308 can access the profile of the particular video communication use that is in current use to determine what the unfavorable threshold levels are for each network parameter listed in the profile. If the network constraint detection component 308 determines that an unfavorable threshold level has been reached, a network constraint is detected and the video parameter adjustment component 310 will adjust the optimal levels of one or more video parameters in a manner that continues to provide an acceptable user experience. In an embodiment, the user of client 300 may define an acceptable user experience. In another embodiment, the developer of the UBOM 302 may determine an acceptable user experience. In either embodiment, the video parameter adjustment component will be configured with logic to adjust the video parameters based on the defined acceptable user experience. In an embodiment, the video parameters with a lower priority level will be adjusted before video parameters with higher priority levels. In an embodiment, once the video parameters have been adjusted, the client 300 can be configured to inform the other devices within the video communication session of the adjustments. By informing the other devices within the video communication session, the other devices can conserve resources by not transmitting video content formatted according to optimal levels of the video content's video parameters. The other devices can configure and transmit a degraded version of the video content to the client 300 according to the adjusted video parameters.

In an embodiment, a termination threshold level for each network parameter may be included within the profile of a video communication use. The termination threshold level is a value used to indicate when to terminate the video communication session. In an embodiment, the network constraint detection component 308 also periodically monitors the current network conditions to determine if any network parameters have reached their corresponding termination threshold levels. If a network parameter reaches its corresponding termination threshold level, the UBOM 302 can be configured to terminate the video communication session.

Figure 4:
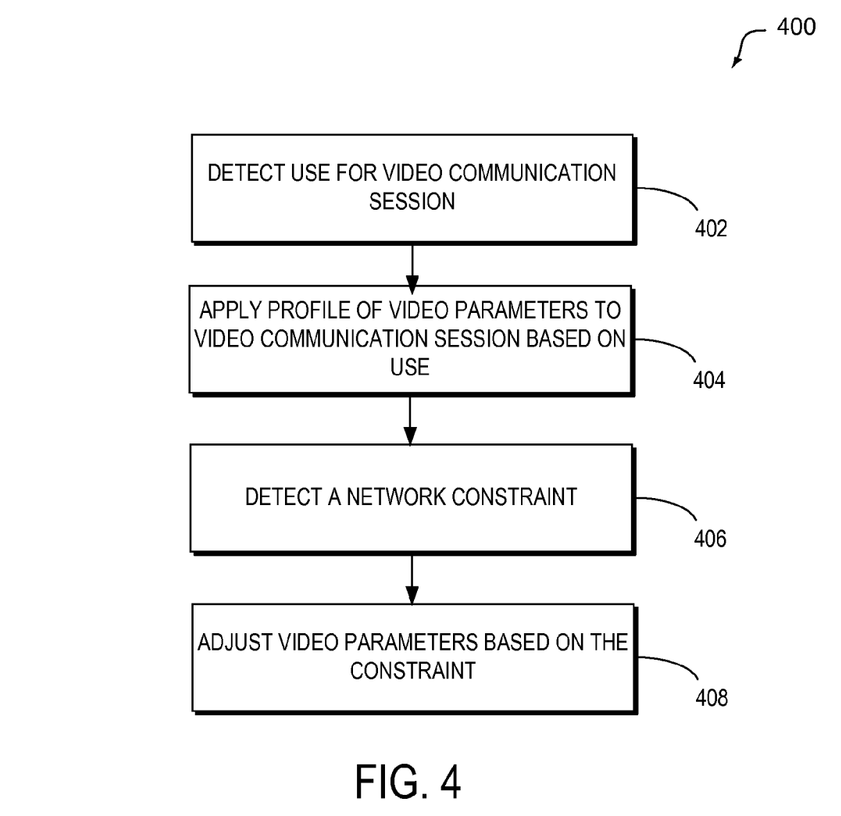
FIG. 4 is a flow diagram of an exemplary method for adjusting video parameters of a video communication session based on a type of use for the video communication session according to an embodiment of the invention.

FIG. 4 is a flow diagram of an exemplary method 400 for adjusting video parameters of a video communication session based on a type of use for the video communication session according to an embodiment of the invention. At operation 402, a use is detected for the video communication session. In an embodiment, the use is detected by a use detection component 304. At operation 404, a profile of video parameters is applied to the video communication session based on the detected use. The profile of video parameters may be retrieved from a profile database 306. At operation 406, a network constraint is detected on a communication network of the video communication session. In an embodiment, the constraint is detected by a network constraint detection component 308. At operation 408, the video parameters of the profile are adjusted based on the constraint. In an embodiment, the video parameters are adjusted by a video parameter adjustment component 310.

Figure 5:
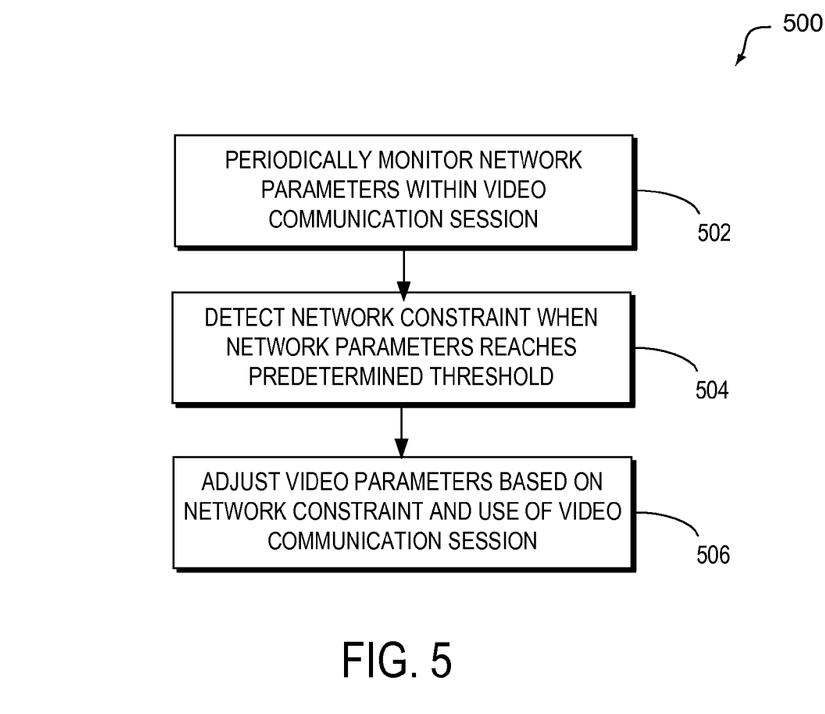
FIG. 5 is a flow diagram of another exemplary method for adjusting video parameters of a video communication session based on a type of use for the video communication session according to an embodiment of the invention.

FIG. 5 is a flow diagram of another exemplary method 500 for adjusting video parameters of a video communication session based on a type of use for the video communication session. At operation 502, network parameters are periodically monitored within a video communication session. In an embodiment, the network parameters are monitored by a network constraint detection component 308. At operation 504, a network constraint is detected when at least one network parameter reaches a predetermined threshold level. The predetermined threshold level may be an unfavorable threshold level as described above. At operation 506, video parameters associated with the video communication session are adjusted based on the detected network constraint and a use of the video communication session. In an embodiment, the video parameters are adjusted by a video parameter adjustment component 310.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more computer-readable storage media having computer-useable instructions embodied thereon for performing a method for adjusting one or more video parameters of a video communication session based on a type of use for the video communication session, the method comprising:
   detecting a use for a video communication session, wherein detecting a use comprises automatically detecting at least one of a type of transmitted video content associated with the video communication session and one or more identifiers associated with one or more data packets of the transmitted video content;
   applying a profile of video parameters to the video communication session based on the detected use;
   detecting at least one constraint on a communication network of the video communication session; and
   adjusting one or more video parameters of the video communication session based on the constraint and the profile;
   further comprising further adjusting the one or more video parameters based on a priority level of each of the one or more video parameters, wherein the priority level of each of the one or more video parameters is based on the use, and a video parameter with a lower priority level is adjusted before a video parameter with a higher priority level.

2. The media according to claim 1, wherein the video parameters of the profile are set to optimal levels for the use.

3. The media according to claim 1, wherein the at least one constraint is detected when a network parameter reaches a predetermined threshold level.

4. The media according to claim 3, wherein the network parameter is at least one of bandwidth, jitter, latency, and packet loss.

5. The media according to claim 1, wherein the video parameters include at least one of screen size, resolution, buffer size, frames per second, color, motion, and audio quality parameters.

6. The media according to claim 1, the method further comprising informing one or more devices within the video communication session of the one or more adjusted video parameters.

7. The media according to claim 6, the method further comprising receiving video content from the one or more devices, the video content being configured according to the one or more adjusted video parameters.

8. One or more computer-readable storage media having computer-useable instructions embodied thereon for performing a method for adjusting one or more video parameters of a video communication session based on a type of use for the video communication session, the method comprising:
   periodically monitoring one or more network parameters within a video communication session;
   detecting a network constraint when at least one network parameter reaches a predetermined threshold level; and
   adjusting one or more video parameters associated with the video communication session based on the network constraint and a use of the video communication session, wherein the use of the video communication session comprises one or more of a motion quality, a detail quality, a color quality, and an audio quality for a particular user, and further wherein the use of the video communication session is determined based on one or more of the following:
   (1) a type of transmitted video content associated with the video communication session, and
   (2) one or more identifiers associated with one or more data packets of the transmitted video content;
   further comprising further adjusting the one or more video parameters based on a priority level of each of the one or more video parameters, wherein the priority level of each of the one or more video parameters is based on the use, and a video parameter with a lower priority level is adjusted before a video parameter with a higher priority level.

9. The media according to claim 8, wherein the one or more video parameters are associated with the video communication session based on the use of the video communication session.

10. A system with one or more computer-readable storage media having computer-useable instructions embodied thereon for adjusting one or more video parameters of a video communication session based on a type of use for the video communication session, comprising:
    a use detection component for detecting a type of use for a video communication session, wherein detecting the type of use comprises detecting one or more of a type of video content being transferred as part of the video communication session and one or more identifiers associated with data packets of the video communication session, and further wherein one or more video parameters are applied to the video communication session based on the detected use;
    a network constraint detection component for detecting one or more network constraints when at least one network parameter reaches a predetermined threshold level; and
    a video parameter adjustment component for adjusting at least one of the one or more video parameters based on the detected network constraint;
    wherein the video parameter adjustment component further adjusts the at least one video parameter based on a priority level of each of the one or more video parameters; wherein the priority level of each of the one or more video parameters is based on the detected use, and a video parameter with a lower priority level is adjusted before a video parameter with a higher priority level.

11. The system according to claim 10, wherein the one or more video parameters are set to optimal levels for the detected use.

* * * * *